Figure 2:
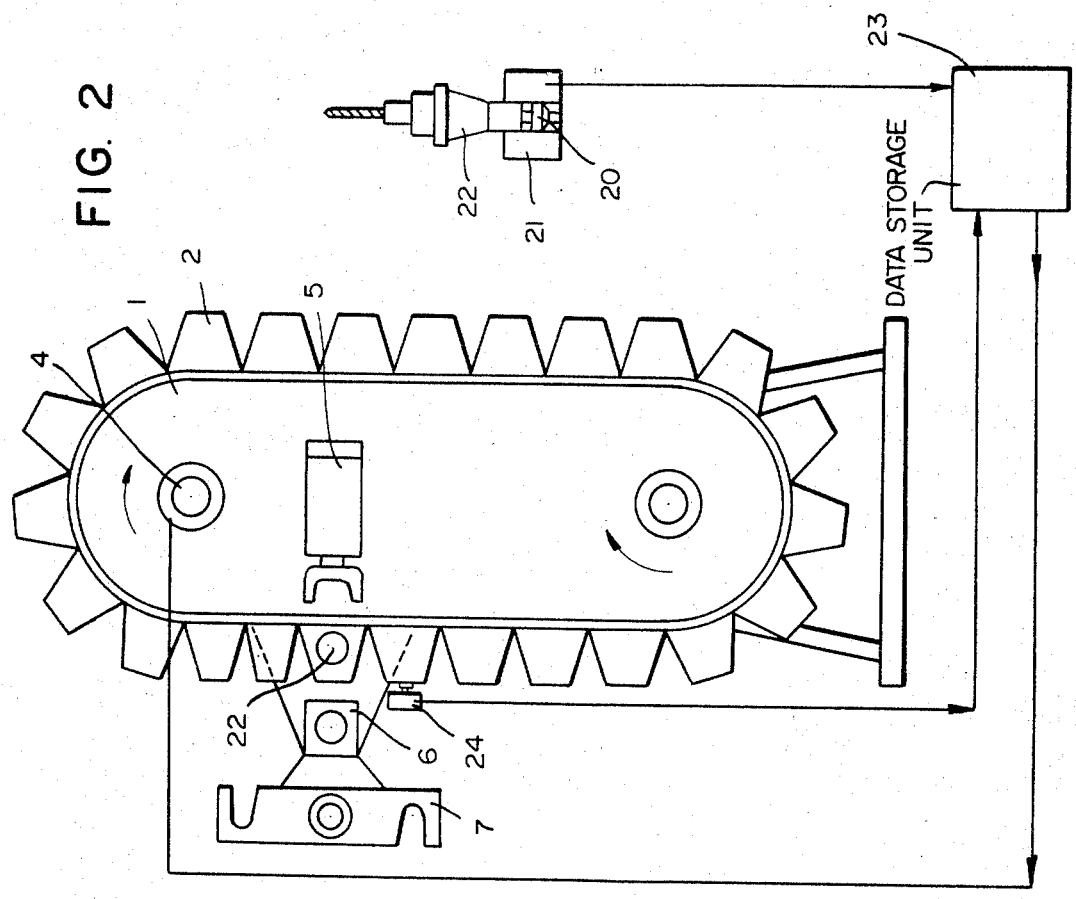

United States Patent [19]
Kuhnert

[11] 3,744,648
[45] July 10, 1973

[54] TOOL STORAGE FOR MACHINING CENTERS WITH A TOOL SEARCH ARRANGEMENT

[75] Inventor: Hans Kuhnert, Wiesloch, Germany

[73] Assignee: Heidelberger Druckmaschinen Aktiengesellschaft, Heidelberg, Germany

[22] Filed: Jan. 20, 1972

[21] Appl. No.: 219,346

[30] Foreign Application Priority Data
Feb. 11, 1971 Germany................... P 21 06 440.4

[52] U.S. Cl............................ 214/1 BB, 214/16.4 R
[51] Int. Cl................................................. B25j 3/00
[58] Field of Search................. 29/568; 214/16.4 R, 214/1 BA, 1 BB

[56] References Cited
UNITED STATES PATENTS
3,128,645   4/1964   Anthony............................... 29/568
3,688,387   9/1972   Zettler.................................. 29/568
3,412,459   11/1968  Hollis................................... 29/568

*Primary Examiner*—Gerald M. Forlenza
*Assistant Examiner*—R. Johnson
*Attorney*—Arthur E. Wilfond, Herbert L. Lerner et al.

[57] ABSTRACT

A tool storage unit for a machining center with a tool searching arrangement for the selection of tools for a specific machining operation, including a tool changing arrangement for removing the selected tool from the tool storage unit and returning the used tool to the place made available therefor in the tool storage. The unit comprises an information storage arrangement which contains information indicating the order of sequence of the tools in the tool storage unit. The tool searching arrangement interrogates the information storage unit, and the selected tool, on the basis of the characteristic information obtained, is exchanged against the previously used tool.

10 Claims, 2 Drawing Figures

PATENTED JUL 10 1973 3,744,648

TOOL STORAGE FOR MACHINING CENTERS WITH A TOOL SEARCH ARRANGEMENT

The invention relates to a tool storage unit for machining centers with a tool searching arrangement for the purpose of selecting a tool provided for the machining operation and of a changer arrangement which picks out the tool from the tool storage and returns the used tool into the place which has become free in the tool storage.

In a tool storage, which has been described in the German Publication, (German Pat. Office No. 1,814,458), the tool numbers are introduced into a computer unit by means of punched cards corresponding to the sequence of the magazine lineup. Thus, a place is set for each of the stored tools. As a tool is taken out of the magazine, it must be returned, after the conclusion of the working operation, to its proper place again as stored by the computer unit. These known tool storage units require long searching periods, since the selection of the next tool may only occur after the return into the magazine of the tool used prior thereto.

A further tool storage unit has been described in the German DAS publication No. 1,260,924, wherein the stored tools have been provided with coded information carriers. During the search process, the tools are conveyed past a tool searching arrangement which acts to scan the code. Thus, the tool is not tied to its place in the magazine, but may, after use, be returned into another, next-in-line empty pocket of the tool storage unit, which has become available.

Under certain conditions, however, a tool selection operating in the above described manner, may also possess some disadvantages. It has been found that for machines with automatic tool chenge, the use of tool magazines with large storage contents is advantageous. Embodiments of magazines with more than 100 tools are known. With the increasing number of tools, however, the searching periods have increased in the known interrogation methods.

Especially with short cycle machining operations known heretofore, such long waiting periods may occur until the next tool has been made ready that the economy of the machine has come into question.

The searching speed generally may not otherwise be increased in a desired manner, since the inertia of a fully or partially charged magazine, on the one side, and the requirement for an exact guidance of the tool for a reliable identification, on the other, would lead to a very costly and expensive magazine construction. Due to wear and the soiling of the tool, the tool pocket and the identification arrangement, difficulties in the tool recognition will occur, especially after a long operating time of the installation.

It is an object of the invention to provide a tool search arrangement for a tool storage unit, which permits a continuous change in the sequence of the tools in the magazine. Moreover, the tool search arrangement, in accordance with the invention, is to be independent of the control of the tools and pockets in the magazine, as well as of the transport velocity of the magazine or of the tool removal arrangement.

The solution of the task, in accordance with the invention, is to be found in that an information storage unit has been provided containing the information which indicates the sequential order of the tools contained in the tool storage unit; in that the tool search arrangement examines the information of the information storage unit, and in that means are provided which exchange the information characterizing the respective selected tool against that of the tool which has been used prior thereto. Thus, an extremely short searching period and great reliability for the scanning of the information, even after a long operating period, has been assured. The disposition of the tools and pockets in the tool storage unit, as well as the soiling of the tools in the magazine has no influence at all on the reliability of the tool selection.

In a preferred embodiment of the invention, the information storage unit turns in synchronism with the tool storage unit. The embodiment includes a number of receivers for the information carriers which are formed as profiled bodies corresponding to the number of pockets in the tool storage unit. The tool search arrangement which controls the tool storage unit acts to scan the profile of the information carriers contained in the receivers of the information storage unit. An exchange arrangement is provided which removes the information carrier corresponding to the selected tool from the receiver and returns the information corresponding to the tool removed before into the receiver which has now become available.

A further effective embodiment of the invention comprises an information storage unit and a tool searching arrangement controlling the tool storage unit which have been combined into an electronic or electromechanical data storage combination unit.

In a preferred embodiment of the invention, a drum is mounted on the axis of a chain magazine which rotates once for each turn of the chain magazine and which comprises a number of symmetrically distributed receivers along its periphery for cylindrical information carriers, which corresponds to the number of the pockets available in the chain magazine for the tools to be received therein. The tool search arrangement is disposed next to the periphery of the drum which, during the rotation, scans the information carriers stored therein. A double grab device is disposed adjacent to the tool searching arrangement for the purpose of effecting an exchange of the information carriers, the grab unit being pivotably disposed.

The reliability in the selection of the correct tool may be increased in that, in accordance with a further embodiment of the invention, there is provided an intermediate grab unit in the chain magazine which removes a selected tool from the pocket and inserts it into an intermediate pocket or transports a used tool from the intermediate pocket into the vacant pocket of the chain magazine. A control arrangement is provided for the intermediate pocket which scans the code of the tools arriving from the chain magazine and compares the information obtained with that provided by the tool searching arrangement.

The scanning of the coding of the tool, in an intermediate pocket, which has been sorted out by the searching arrangement, takes placed during the complete rest position of the information carriers. The conveying velocity of the magazine chain, therefore, cannot disadvantageously affect the scanning of the coding. The information carriers affixed to the tools are only utilized in order, after the selection, to determine whether the correct tool has been made available. In such a case, both the items of information must agree.

The attachment of information carriers on the tool is also of advantage when a data storage unit is used as a tool search arrangement. Thus, a further embodiment of the invention includes a data storage unit which controls the driving motor for the chain magazine which receives the information to be stored, from a read-in station, and which, during the charging of the chain magazine, scans the coding of the tools.

Figure 1:
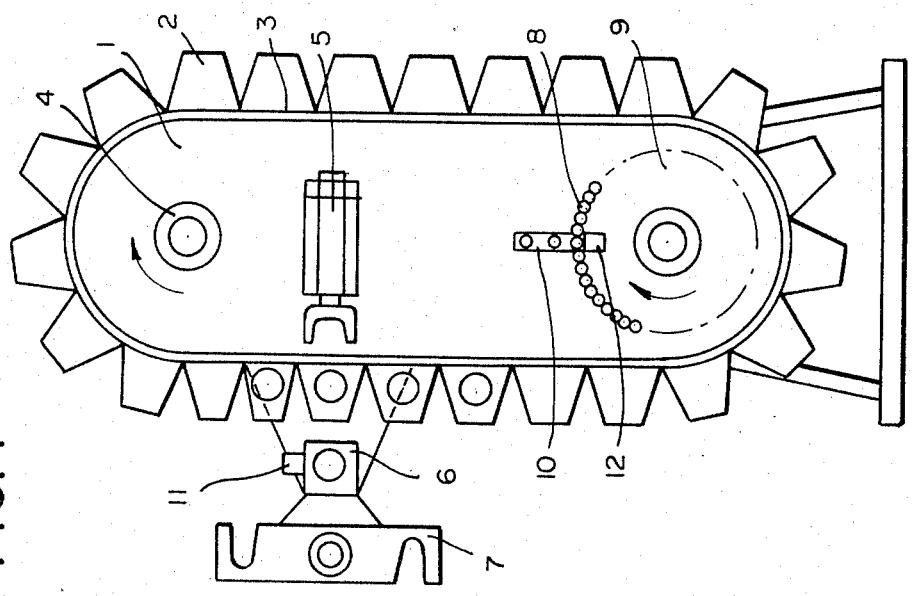

With these and other objects in view, which will become apparent in the following detailed description, the present invention will be clearly understood in connection with the accompanying drawings, in which:

FIG. 1 shows a tool storage unit with a tool changing arrangement and a tool searching arrangement which acts to scan the information carriers, and FIG. 2 shows a tool storage unit combined with a data storage unit acting as a tool searching arrangement.

A chain magazine 1 receives tools in pockets 2. If a tool is to be selected, chain 3 is turned by means of a driving motor until the pocket 2 containing the desired tool stands opposite to the intermediate grab unit 5 which is secured to the magazine. The intermediate grab 5 moves ahead and inserts the selected tool into a fixed intermediate pocket 6 from which, with the aid of a changer 7, it is exchanged against a tool disposed in a working spindle (not shown), of a machine tool. The exchanged tool is then returned by the intermediate grab 5 from the intermediate pocket 6 into the empty pocket 2 of the chain magazine 1. Upon return of the intermediate grab 5 again to its original position, it becomes possible to initiate the next selection process in the chain 3.

The recognition of the tools in the chain 3 is obtained through information carriers 8, for instance pins with coding rings which are received in a drum 9 driven by chain magazine 1. The drum 9 turns once for each of the chain rotations. During this rotation, the codings of the stored tools may pass by the tool searching arrangement 12. When the stored information agrees with that obtained from the instruction, the tool searching arrangement stops the driving motor 4. The sequence of the information carriers 8 in the drum 9 corresponds to that of the tools in the chain 3. Each tool has an information carrier 8 associated therewith.

Since the tools change their position in the chain 3 due to the tool exchanges, such a change must also take place in respect to the information carriers 8 in the drum 9. Accordingly, for each tool change, the information carrier 8 of the selected tool is removed from the drum 9 by means of a double grab 10 and is exchanged against the information carrier 8 removed during the preceding exchange. The information carrier 8, which corresponds to the respective tool disposed in the working spindle of the machine tool, thus is always disposed on the side of the double grab 10 turned away from the drum 9. When the tools is chain magazine 1 are being charged or discharged, the associated information carrier 8, too, must always be introduced into the drum 9 or removed therefrom.

In order to recognize service defects in time, for instance, in connection with the correlation, the disposition may be further enlarged in respect to the testing of a second information carrier 20, directly disposed on the tool in the form of a code (FIG. 2). This test is suitably achieved by means of a control arrangement 11 in the intermediate pocket 6. In this case, the scanned coding of the information carrier 8 disposed in the drum 9 must agree with the coding 20 of the tool contained in the intermediate pocket 6.

Only when such is the case, the selected tool is introduced into the working spindle of the machine tool by means of the changer 7.

The testing of the coding of the tool in the intermediate pocket 6 takes place statically, that is, the tool and the control arrangement 11 are in the rest position. For this reason, the difficulties of the direct tool recognition mentioned above do not occur in the solution in accordance with the invention.

The tool magazine and the information carriers contained in the drum, as described hereinabove, are not required to be connected rigidly with one another. Should there be two separate drives for the magazine and the drum, there may at first, due to the very small mass of the drum, a search run for the information carrier be carried out in the drum alone. When the information carrier has been found, it is possible to determine through directional logic that the tool magazine convey the desired tool over the shortest path into the delivery position for the tool exchange.

A very considerable reduction in the search run period is obtained through this expedient. Furthermore, the tool magazine and the tool pockets provided for holding the tool may be made very simply and in the cheapest manner.

The invention is not limited only to the embodiment described hereinabove. Rather, a further embodiment is described herewith in connection with FIG. 2, in which the information data contained in the information carrier 8 is transduced into an electronic or electromechanical data storage unit 23. This data storage unit 23 controls the search operation of the chain magazine 1.

In this case, according to FIG. 2, the information carrier 20 secured to the tool 22 is read by a read-in station 21 affixed to the chain magazine 1 during the charging of the chain magazine 1 and the information stored in the data storage unit 23. After the charging operation of the chain magazine 1, all the tool numbers are stored in the data storage unit 23 in the sequence of the order of the tools in the chain magazine 1. During the selection procedure, the data storage unit 23 receives an impulse from a switch 24 disposed on the chain magazine 1 initiated by the pocket 2 which has been conveyed past, and which effects the change-over of one tool number to the next following. The data storage unit 23 transmits a stop signal to the driving motor 4 of the magazine 1 as soon as the requested tool number agrees with the respective actual number. The tool, thus located, is inserted into the working spindle of the machine tool by way of the intermediate pocket 6 in which another test may take place. The tool number of the tool returning to the chain magazine 1 is exchanged in the data storage unit 23 against the number of the previously selected tool. Thus, the order of the tools in the chain magazine 1 is maintained together with the order of the tool numbers in the data storage unit 23, and the next searching process may then be initiated.

The invention is not limited to the embodiments shown and described hereinabove. For instance, it may be possible to use bin- and drum-like tool storage units in place of the chain magazine. Instead of the profiled information carriers, another embodiment in accordance with the invention may, for instance, utilize arrangements which may be scanned optically, pneumatically or electromagnetically.

While I have disclosed several embodiments of the present invention, it is to be understood that these embodiments are given by example only and not in a limiting sense, the scope of the present invention being determined by the objects and the claims.

It is claimed:

1. In a machining center, the combination comprising means for storing a plurality of tools, means for searching said stored tools for a tool required for a given operation, tool exchanging means including means for removing a required tool from and for returning a used tool to said tool storing means, means for storing information pertaining to the sequential order of the tools in said storing means, means for interrogating said information storing means, and means for exchanging information pertaining to the selected tool against the information of the previously used tool.

2. The combination according to claim 1, wherein said tool storage means comprises a plurality of tool receiving pockets forming a chain, means for rotating said chain, means for effecting rotation of said information storing means synchronously with the rotation of said tool storing chain, said information storing means including a number of information carriers formed as profiled elements corresponding to said tools in said tool storing means, further including means for controlling said tool storage means having means for scanning said profiled elements, and means controlled by said scanning means for actuating said information exchanging means, whereby information carriers respectively corresponding to the selected and the used tool are exchanged in said information storage means.

3. The combination according to claim 2, wherein said information storing means comprises a plurality of pockets for said information carriers corresponding to said tool storing pockets.

4. The combination according to claim 2, wherein said tool searching means includes means for controlling said tool storage means and with said information storing means comprises a combined data storage unit.

5. The combination according to claim 4, wherein said date storage unit is electronic.

6. The combination according to claim 4, wherein said data storage unit is electromechanical.

7. The combination according to claim 2, wherein said tool storing chain includes an axis of rotation, a drum on said axis for rotation with said chain, said drum having a plurality of symmetrically disposed pockets along its periphery for receiving cylindrical information carriers corresponding to the number of tool storing pockets, said tool searching means being disposed in the vicinity of the periphery of said drum for scanning said information carriers, further including a rotatable double grab mounted adjacent said information carrier for effecting an exchange of said carriers.

8. The combination according to claim 7, further including an intermediate grab element mounted adjacent said tool storing chain movable to remove a selected tool from the respective pocket in said chain for sequentially receiving a tool from and a used tool moving into said chain, further including means connected to said intermediate pocket for scanning said selected tool in said intermediate storing pocket, means for supplying information pertaining to a tool from said tool searching means, and means for comparing the information from said last named scanning and said information supplying means.

9. The combination according to claim 2, further including a motor for driving said chain, a data storage unit controlled by said motor, data read-in means for supplying data to said data storage unit, means for scanning code information pertaining to tools being charged into said tool storing chain operatively connected to said read-in unit.

10. The combination according to claim 2, including a separate driving motor for said chain and for said information storage unit, means for effecting a searching run for said information storing unit independent of the rotation of said chain, and means controlled by said information storing unit for providing directional logic to said tool storing chain driving motor.

* * * * *